(12) United States Patent
Tailliet et al.

(10) Patent No.: US 8,892,798 B2
(45) Date of Patent: Nov. 18, 2014

(54) IDENTIFICATION, BY A MASTER CIRCUIT, OF TWO SLAVE CIRCUITS CONNECTED TO A SAME BUS

(75) Inventors: François Tailliet, Fuveau (FR); Yvon Bahout, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 84 days.

(21) Appl. No.: 13/253,376

(22) Filed: Oct. 5, 2011

(65) Prior Publication Data

US 2012/0079151 A1 Mar. 29, 2012

Related U.S. Application Data

(63) Continuation-in-part of application No. 13/243,385, filed on Sep. 23, 2011.

(30) Foreign Application Priority Data

Sep. 27, 2010 (FR) ...................................... 10 57754

(51) Int. Cl.
*G06F 13/00* (2006.01)
*G06F 13/42* (2006.01)

(52) U.S. Cl.
CPC .................................. *G06F 13/4291* (2013.01)
USPC ............................ 710/110; 710/305; 710/107

(58) Field of Classification Search
USPC .............................................. 710/110, 107, 5
See application file for complete search history.

(56) References Cited

U.S. PATENT DOCUMENTS

| 5,404,460 | A | 4/1995 | Thomsen et al. |
| 6,009,479 | A | 12/1999 | Jeffries |
| 6,799,235 | B2 | 9/2004 | Bormann et al. |
| 6,912,606 | B2 | 6/2005 | Fay |
| 6,928,501 | B2 | 8/2005 | Andreas et al. |
| 6,931,456 | B2 * | 8/2005 | Payne et al. ........................ 710/9 |
| 7,065,593 | B2 | 6/2006 | Ripy et al. |
| 7,099,970 | B1 * | 8/2006 | Foegelle et al. ............... 710/110 |
| 7,565,470 | B2 | 7/2009 | Lin |
| 7,631,110 | B2 | 12/2009 | Berenbaum et al. |
| 7,650,449 | B2 | 1/2010 | Lu |
| 7,707,339 | B2 * | 4/2010 | Pigott et al. .................... 710/110 |
| 7,995,607 | B2 * | 8/2011 | Soloviev ....................... 370/462 |
| 8,205,017 | B2 | 6/2012 | Parr et al. |

(Continued)

FOREIGN PATENT DOCUMENTS

JP S60182245 A 9/1985

OTHER PUBLICATIONS

French Search Report dated May 6, 2011 from corresponding French Application No. 10/57752.
Written Opinion dated May 16, 2011 from corresponding French Application No. 10/57752.

(Continued)

*Primary Examiner* — Faisal M Zaman
*Assistant Examiner* — Kim Huynh
(74) *Attorney, Agent, or Firm* — Gardere Wynne Sewell LLP

(57) ABSTRACT

A method of communication between a master circuit and two slave circuits over a serial bus wherein: the two slave circuits simultaneously transmit their associated identifiers; the two slave circuits simultaneously transmit the inverse of these identifiers; and each slave circuit exploits the combinations present on the bus to determine an order of communication between the two circuits.

30 Claims, 4 Drawing Sheets

(56) References Cited

U.S. PATENT DOCUMENTS

| | | |
|---|---|---|
| 2002/0035658 A1 | 3/2002 | Whetsel |
| 2002/0112106 A1* | 8/2002 | Henehan et al. ............. 710/113 |
| 2003/0070018 A1* | 4/2003 | Lai et al. ....................... 710/107 |
| 2007/0026716 A1 | 2/2007 | Zhang |
| 2008/0091862 A1 | 4/2008 | Hiraka |
| 2011/0119419 A1* | 5/2011 | Chapelle ....................... 710/110 |

OTHER PUBLICATIONS

INPI Search Report and Written Opinion for FR 1057754 dated May 12, 2011 (12 pages).

Anonymous; The 12C-Bus Specification, Philips Semiconductors, [Online] Verson 2.1, Jan. 1, 2000, pp. 1-46 XP002590803.

* cited by examiner

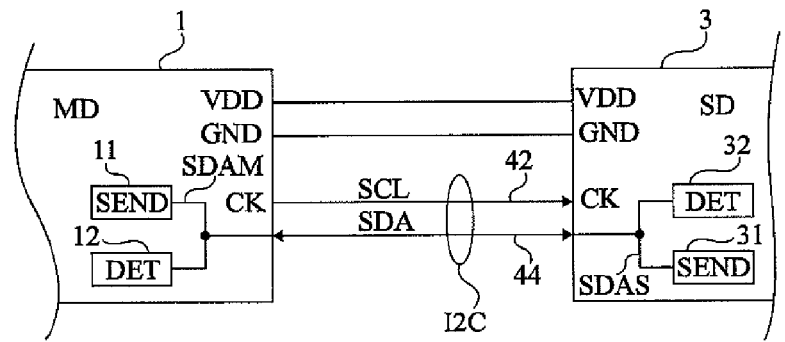
Fig 1
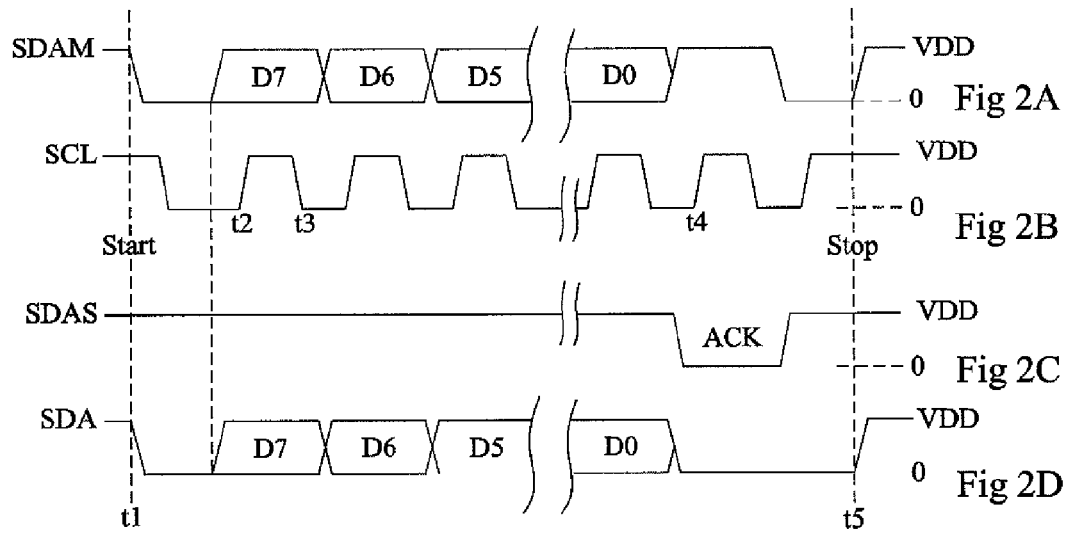
Fig 2A
Fig 2B
Fig 2C
Fig 2D
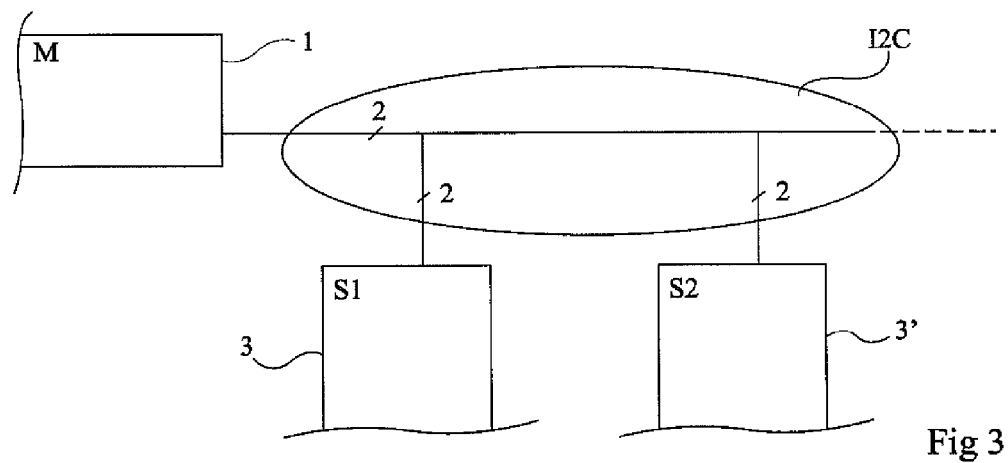
Fig 3

IDENTIFICATION, BY A MASTER CIRCUIT, OF TWO SLAVE CIRCUITS CONNECTED TO A SAME BUS

BACKGROUND OF THE INVENTION

1. Field of the Invention

The present invention generally relates to electronic circuits and, more specifically, to the transmission of digital data in a master-slave system. The present invention more specifically applies to communications over a so-called open-drain or open-collector bus (according to the MOS or bipolar technology), according to a protocol where the transmission speed is independent from the states of the transmitted bits.

The present invention, for example, applies to transmissions over a twin-wire bus conveying data and a synchronization signal, for example, of I2C type.

2. Discussion of the Related Art

In an open-drain (or open-collector) bus, the data conductor of the bus is, in the idle state, at a voltage different from ground (generally, a positive voltage). The data are coded and then transmitted by the pulling of the bus to ground according to a pre-established coding enabling the receiver to decode the data.

Many communication protocols exploiting an open-drain (or open-collector) bus are known. Be they protocols over a single-wire bus (for example, a protocol known as SWP) or over a multi-wire bus (for example, I2C-type twin-wire protocols), when several slave circuits are connected to a same bus and are capable of communicating with a same master circuit, the master circuit should send over the bus an address or an identifier of the slave circuit enabling it to recognize itself and to respond. The other slave circuits which do not recognize themselves with the address remain silent.

In usual systems, it is thus necessary for the master circuit to know the addresses of the different slave circuits, short of which several slave circuits are capable of responding at the same time, which makes the transmission impossible to be interpreted.

SUMMARY OF THE INVENTION

An embodiment overcomes all or part of the disadvantages of known systems of communication over an open-drain (or open-collector) bus.

Another embodiment enables two slave circuits to identify themselves for a master circuit.

Another embodiment provides a solution more specifically intended to communication protocols in which bits are transmitted over periods having durations independent from the respective states of the bits.

Another embodiment provides a solution enabling a simultaneous communication between a master circuit and two slave circuits.

An embodiment provides a method of communication between a master circuit and two slave circuits over a serial bus wherein:

the two slave circuits simultaneously transmit their associated identifiers;

the two slave circuits simultaneously transmit the inverse of these identifiers; and each slave circuit uses the combinations present on the bus to determine an order of communication between the two circuits.

According to an embodiment, the master circuit triggers the previous steps by the sending of a specific control signal over the bus.

According to an embodiment, said control signal is preceded by the sending, by the master circuit, of an address common to the two slave circuits.

According to an embodiment, each slave circuit determines a relation between its own identifier and that of the other slave circuit.

According to an embodiment, the relation between identifiers is an order relation.

According to an embodiment, each slave circuit transmits to the master circuit an address concerning it, the transmission order being set by the relation between the respective identifiers of the slave circuits.

According to an embodiment, each slave circuit transmits to the master circuit its identifier as an address.

According to an embodiment, the bus is an open-drain (or open-collector) bus in which a bit is transmitted over a period having a duration independent from the state of the bit.

Another embodiment provides an electronic circuit of transmission over a serial bus.

Another embodiment provides a master-slave transmission system between a master and two slaves.

The foregoing and other objects, features, and advantages will be discussed in detail in the following non-limiting description of specific embodiments in connection with the accompanying drawings.

BRIEF DESCRIPTION OF THE DRAWINGS

FIG. 1 partially shows in the form of blocks two circuits capable of communicating in an I2C-type master-slave protocol;

FIGS. 2A, 2B, 2C, and 2D illustrate a communication between the two circuits of FIG. 1;

FIG. 3 schematically shows in the form of blocks an example of a communication system according to an embodiment;

DETAILED DESCRIPTION

Figure 4:
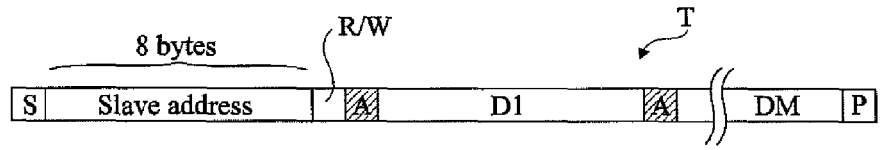
FIG. 4 illustrates a usual I2C protocol communication frame.

The same elements have been designated with the same reference numerals in the different drawings. For clarity, only those steps and elements which are useful to the understanding of the discussed embodiments will be described. In particular, the use made of the data in each of the communicating circuits has not been detailed, the described embodiments being compatible with current uses of such data. Further, the coding of the signals to be transmitted by the different communicating circuits has not been detailed either, the described embodiments being here again compatible with usual circuits for coding such signals.

The embodiments will refer hereafter to a communication using the features of a protocol known as I2C. The present invention however more generally applies to any communication protocol using at least one data transmission wire in an open-drain (or open-collector) protocol, and where the durations of the periods over which the bits are transmitted are independent from the states of these bits (the transmission of a 1 takes the same time as the transmission of a 0).

FIG. 1 is a block diagram of an embodiment of a system of communication between a master device 1 and a slave device 3 according to the I2C protocol.

In the example of FIG. 1, circuit 1 is a master device (MD) and is capable of communicating, over an I2C bus, with one or several slave devices 3 (SD). The different system circuits may be powered independently from one another or, as shown, by a power supply bus capable of conveying at least a power supply voltage VDD and a reference voltage (GND), for example, the ground.

Each circuit 1, 3 for example comprises a transmit circuit (SEND) 11, 31 and a receive circuit (DET) 12, 32. Circuits 1 and 3 are connected to each other by the I2C bus as well as by the two wires VDD and GND of the power supply bus.

A first wire 42 of bus I2C conveys a clock signal (SCL) between two terminals CK of circuits 1 and 3. Typically, this clock signal is imposed by master circuit 1. A second wire 44 of bus I2C conveys the data (SDA) between the two circuits. Bus I2C is bidirectional.

FIGS. 2A, 2B, 2C, and 2D are timing diagrams illustrating an example of transmission of a data word (typically a byte) from the master circuit to slave circuit 3.

To clarify the description, FIGS. 2A, 2B, 2C, and 2D show the shape of signals respectively corresponding to the signal (SDAM) set by transmit circuit 11 of the master circuit on wire 44, to the clock signal (SCL) imposed by the master circuit, to the signal (SDAS) set by circuit 31 on wire 44, and to the resulting level (SDA) of this wire. Despite the simplified representation of FIG. 1, it is considered that the respective receive circuits 12 and 32 of circuits 1 and 3 observe the state of wire 44 independently from levels SDAM and SDAS imposed by their transmit circuits 11 and 31. Similarly, for simplification, the voltage drops with respect to the power supply voltage are neglected and the high levels are considered to correspond to voltage VDD while the low levels are considered to correspond to ground.

In the idle state, both wires 42 and 44 of bus I2C are in the high level. This characterizes a so-called open-drain (or open-collector) bus, where the bus is pulled to the power supply voltage and is then forced to a lower state (in this example, the ground) by the different communicating devices.

Assuming that the circuit wants to transmit a data frame to circuit 3, it takes control of the bus by imposing a low level on signal SDA (time t1) while signal SCL remains at the high level. This starting condition (Start) is detected by the slave circuit 3 connected to the bus. Once this starting condition is achieved, circuit 1 generates clock signal SCL. Then, circuit 1 imposes a level 1 or 0 on wire 44 (signals SDAM and SDA) according to the first bit D7 of the byte to be transmitted. This setting of wire 44 should occur before the rising edge of the clock signal (time t2) which validates the transmitted data. When signal SCL returns to the low level (time t3), the master circuit can impose the level corresponding to the state of the next bit D6 on wire 44, and so on. Once last bit D0 has been transmitted, the master circuit sets signal SDAM to the high state, to monitor the arrival of an acknowledgement. At the same time, its detection circuit 12 monitors the real state of wire 44.

To indicate a correct reception, slave circuit 3 imposes a low level (FIG. 2C) on wire 44 (signals SDAS and SDA). The master circuit verifies the state of wire 44 at the rising edge (time t4) of signal SCL which follows its setting of signal SDAM to the high state. If wire 44 is at the low level (as illustrated in FIG. 2C), this means that the transmission has been successful. If not, the master circuit may retransmit the data (a starting condition (Start) must be transmitted over the I2C bus for this purpose). An end-of-transmission (bus deallocated) is notified by the master circuit by switching of signal SDA to the high level while signal SCL also is at the high level (time t5). Once this stop condition (Stop) has been achieved, the I2C bus is free to start another I2C frame. It may be, for example, a transmission from circuit 3 to circuit 1. The I2C communication protocol sets different additional conditions in the transmission according to whether it concerns an address, data, a writing into or a reading from the slave circuit, etc. In particular, an address is generally provided when several slave circuits are capable of being connected to the same bus.

FIG. 3 very schematically shows in the form of blocks an example of a master-slave transmission system in which a master circuit 1 is capable of communicating with two slave circuits 3 (S1) and 3' (S2) and possibly with still other slave circuits, connected to the I2C bus. To simplify the representation of FIG. 3, the slave circuits have been considered to be powered separately and individually with respect to one another.

FIG. 4 very schematically shows a usual transmission frame T according to the I2C protocol. Following the start bit (S in FIG. 4), the master circuit sets the address of a slave circuit (Slave address) on the I2C bus. Generally, this address is over one or two bytes, but any other configuration can be appropriate. The address is followed by a bit R/W indicating to the concerned slave circuit whether the master intends to write or to recover data from it. This bit R/W is followed by an acknowledgement bit A set by the concerned slave circuit (symbolized with hatchings to show that it originates from the slave circuit). Then, the master circuit sends data bytes D1, . . . , Dn, each followed by an acknowledgement from the slave circuit. The sending of data from the master to the slave is here assumed. In the case of a data recovery, the slave circuit sends the data and the master circuit sends an acknowledgement at the end of each byte. The transmission ends with stop bit P.

This system operates properly, provided for the master circuit to be capable of addressing a single slave circuit at a given time. Indeed, if this is not possible, two slave circuits consider themselves as addressed, which generates a conflict over the bus.

Now, in certain applications, slave circuits are capable of being connected to the bus while the master circuit does not know their address.

An example of application relates to the case of electronic devices in which two slave circuits are capable of being connected to a same serial bus and should be accessible by a master circuit. Such is the case, for example, for a system in which several batteries for powering an electronic device are capable of being connected to a same bus for authentication purposes.

The present invention will be described hereafter by more specifically referring to an I2C bus. It should however be noted that it more generally applies to any communication between a master circuit and several slave circuits over a serial bus of open-drain (or open-collector) type, wherein the bit transmission period is identical whatever the state of this bit.

Figure 5:
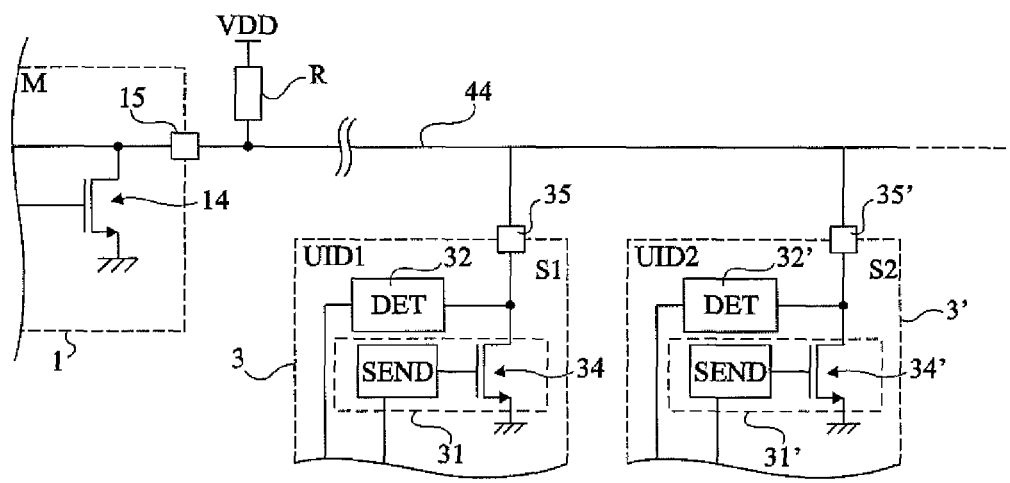
FIG. 5 very schematically shows the data conductor of an open-drain (or open-collector) bus and its connections in a system of the type in FIG. 3.

FIG. 5 schematically and partially shows a serial bus 44 (for example, the SDA conductor of an I2C bus) and its connections to a master circuit 1 and to two slave circuits 3 and 3'. Each circuit 1, 3, 3' comprises a switch 14, 34, or 34' grounding a terminal, respectively 15, 35 or 35', intended to be connected to bus 44. Further, as already mentioned, conductor 44 is, in the idle state, pulled to voltage VDD, for example, by a resistive element R. In practice, switches 14, 34, and 34' are most often made in the form of N-channel MOS transistors, which is the reason why reference is made to an open-drain (or open-collector) serial bus. Switch 14 of master circuit 1 is controlled by its transmit circuit 11 (not shown in FIG. 5). Switches 34 and 34' of circuits 3 and 3' are respectively controlled by transmit circuits 31 and 31' (SEND). As already illustrated in relation with FIG. 1, terminals 35 and 35' are further connected to the input of detectors 32 and 32' (DET) enabling each slave circuit to decode the signals present on the bus. The representation of FIG. 5 is partial and other circuits, in particular for processing transmitted data and data to be transmitted, equip the master and slave circuits.

To be able to communicate with the two slave circuits, master circuit 1 needs to identify them to address thereto the frames respectively concerning them.

In the embodiment of FIG. 5, the two slave circuits 3 and 3' are assumed to share the same address and are thus not identifiable by the master circuit when they are connected to the bus. For example, said slave circuits are two different batteries which need to be authenticated by the master circuit. They may also be other consumables of ink cartridge type connected to a same bus. More generally, this embodiment applies as soon as two slave circuits are capable of being connected to the bus while being addressed by means of a same address by the master circuit.

In a simplified embodiment where two slave circuits only are connected to the bus, this amounts to being able to connect, to this bus, two slave circuits with no address.

Figure 6:
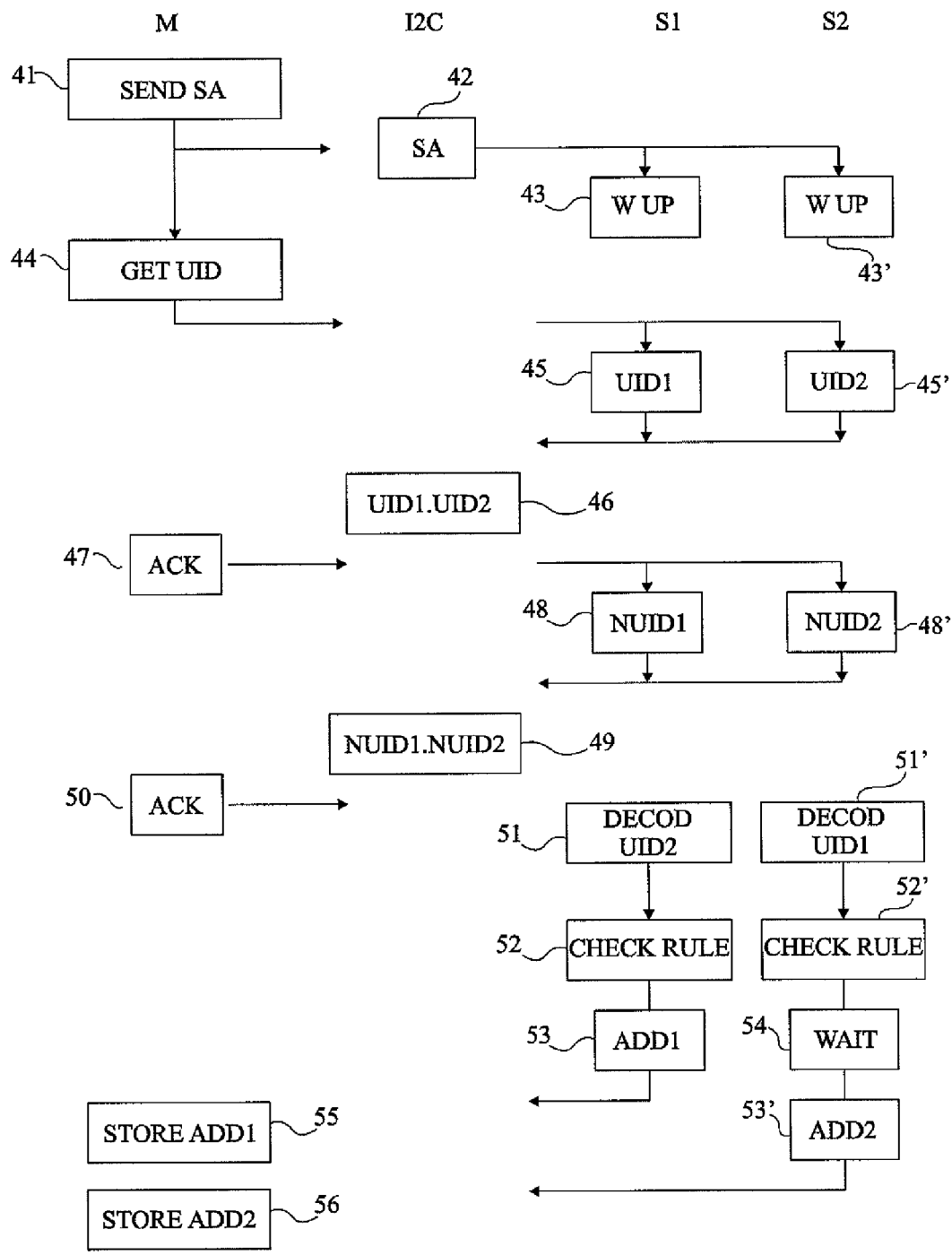
FIG. 6 very schematically illustrates in the form of blocks an embodiment of the method of identification of slave circuits by a master circuit according to an embodiment.

FIG. 6 is a simplified flowchart illustrating a mode of identification by a master circuit of two slave circuits sharing the same address.

Figure 7:
FIG. 7 illustrates a frame according to the method of FIG. 6.
Figure 7:
Figure 7:
Figure 7:

FIG. 7 illustrates an example of a communication frame corresponding to this identification process.

In a first optional step (block 41, SEND SA), master circuit M sends, over the bus, the address corresponding to the two slave circuits. This address (block 42, SA) present on the bus is detected by slave circuits S1 and S2, which wakes them up (blocks 43 and 43', WUP) or activates them. In practice, this address may correspond to that of a port of the bus to which one or two slave circuits may be connected.

The master circuit then sends a control signal requesting an identifier (block 44, GET UID).

In the simplified embodiment where two slaves only are connected to the bus, steps 41 and 42 may be omitted and the sending of control signal 44 wakes up the two slave circuits connected to the bus.

As illustrated in FIG. 7, regarding the communication frame, the master circuit initiates, as previously, a communication by means of a starting bit S, and then sends the address of the slave. The protocol may here be modified with respect to a conventional I2C process since bit R/W is not necessary for the identification phase. Preferably, the master circuit waits for an acknowledgement bit A, even if it is not capable of identifying which of the slave circuits has transmitted it. This at least informs it of the fact that the slave circuits have had time to be activated. The master circuit then sends control signal GET UID and detects a corresponding acknowledgement, here again coming from one or the other of or from both slave circuits.

Each circuit S1, S2 then sends over the bus a single identifier concerning it (block 45, UID1 and block 45', UID2). This identifier is single in that it must enable to distinguish the slave circuit from any other slave circuit capable of being connected to the port accessible with address AD. Such an identifier is for example stored in a non-volatile memory on manufacturing of the slave circuit.

In the example of FIG. 7, the identifier is assumed to be over eight bits (B0 to B7). Regarding bus I2C, the sending of two identifiers translates as an AND-type combination of these identifiers. Indeed, if the current bit of one of the identifiers is at a state 1, that is, high level VDD, the corresponding switch 34 or 34' remains off. If the current bit is at a state 0, the switching of switch 34 or 34' forces the state of the bus to ground. Accordingly, 0 prevails over 1. It should be noted that the assigning of a value 0 or 1 of the identifier bit with respect to the high or low voltage is a convention, the combination automatically performed on the bus thus amounting, according to the adopted convention, to a logic AND or OR.

This bit-to-bit addition of the identifiers is of no use for the master circuit. Said circuit may however send an acknowledgement bit (block 47, ACK). This enables, if need be, to synchronize the transmission. However, each slave circuit receives combination UID1*UID2 and stores it.

Then, each slave circuit S1 and S2 sends (block 48 and 48') inverse NUID1, respectively NUID2, of its identifier.

This results in a logic NOR-type (or NAND-type, according to the coding) combination of the identifiers on the bus (block 49, NUID1*NUID2).

In the same way as for the transmission of the non-inverted identifiers, the master circuit may send an acknowledgement (block 50, ACK).

Slave circuits 3 and 3' store the combination of the inverted identifiers.

Each slave circuit, knowing its own identifier, the combination of this identifier with the identifiers of the other slave circuit, and the combination of the respective inverses of these identifiers, decodes (block 51, DECOD UID2 and block 51' DECOD UID1) the identifier of the other slave circuit. The master circuit still does not know either of the identifiers. However, each slave circuit knows the identifier of the other one.

It is then possible to implement a rule of determination (blocks 52 and 52', CHECK RULE) of the slave circuit to which a given address is assigned, or more generally a communication order between the two slave circuits.

In the example of FIG. 6, the communication protocol sets a rule according to which the slave circuit having the identifier with the smallest value (for example, circuit S1) first transmits its address (block 53, ADD1) to the master circuit. Slave circuit S2 sets to a waiting mode (block 54, WAIT) to transmit its address (block 53', ADD2) to the master circuit. It for example detects the acknowledgement of the first address by the master circuit.

Accordingly, the master circuit successively receives address ADD1, that it stores (block 55, STORE ADD1), and then address ADD2, that it stores (block 56, STORE ADD2). Once this initialization phase has been carried out, the master circuit is capable of sending messages, either to slave circuit S1, or to slave circuit S2.

It will be ascertained that addresses ADD1 and ADD2 are different from each other. For example, a dynamic assignment based on an established convention is provided by taking the order between identifiers UID into account. The addresses may also be sent by the master circuit and taken into account by the slave circuits according to the established convention.

According to another embodiment, the entire identifier UID1 and UID2 is transmitted to the master circuit. This transmission may be carried out successively, or alternately, one byte out of two, by each slave circuit towards the master circuit.

According to an alternative embodiment, the identifier bytes are successively and alternately sent by each slave. It may also be provided for the acknowledgement bit to be sent by the slave circuits and not by the master circuit. The latter may however verify the individual behavior of each slave circuit by verifying that, at the end of each byte transmission, an acknowledgement bit is actually present on the bus.

According to still another example, the address simply corresponds to a bit 0 or 1 since it is sufficient for the master circuit to be capable of distinguishing, at the sending of its frames, whether they are intended for one of the two slave circuits. If other slave circuits are capable of being connected to the bus, this additional bit completes address SA or replaces one bit thereof.

The decoding by each of the slave circuits of the identifier of the other one (block 51 and 51') may be performed at the end of the reception of combinations 46 and 49 or, as a variation, progressively if each slave circuit successively transmits a byte of its identifier and the same byte, inverted. In this case, the decoding is faster.

According to another variation, the decoding is stopped as soon as one bit differs in the identifiers transmitted by the slave circuits. This is sufficient to apply a rule setting which of the circuits first sends a response to the master circuit.

It may also be provided to alternate the transmission of the identifiers and of their inverse, bit by bit. The necessary storage space is thus decreased to a minimum.

According to still another variation, no address is transmitted to the master circuit and said circuit only communicates with the two slave circuits in a determined order. The slave circuits having mutually identified themselves, each one is capable, by being applied the shared rule, of knowing whether the communication is or not intended for it.

An advantage of the described embodiments is that they enable a symmetrical simultaneous communication between a master and two slaves, while these two slaves originally share a same address on the bus.

This may be advantageous, for example, in real-time processing, alarm management applications, etc.

Another advantage is to enable the communication between a master circuit and two slave circuits with no address constraint at the slave circuit level.

Figure 8:
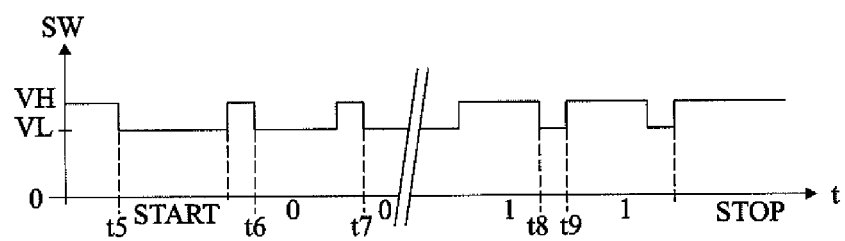
FIG. 8 is a timing diagram illustrating an example of a communication protocol to which the present invention applies.

FIG. 8 is a timing diagram illustrating another example of communication protocol to which the described embodiments may apply.

It is a single-wire communication protocol in which the synchronization signal is transmitted at the same time as the data (and possibly as the power supply signal).

As in the previous embodiments, the bus (signal SW) is idle in a high state VH.

However, conversely to the above-described protocols, the bus modulation switches, contained in the master and slave circuits, do not ground the bus, but set it to a level VL lower than level VH. To transmit data, the concerned circuit modulates the amplitude of signal SW between levels VH and VL. In the shown example, a transmission initiated by the master circuit is initialized by a start bit START with which signal SW is forced (time t5) to level VL. This initializes the slave circuits and prepares them to receive data. The master circuit modulates the level of signal SW at the rate of a clock signal which sets the transmission flow rate. The transmission of a bit at level 0 is for example performed with a pulse of level VL of a duration shorter than the half-period of the clock signal (in the shown example, one quarter of period T) while a level 1 is coded with a pulse of level VL having a duration greater than the half-period of this signal (for example, three quarters of period T). The slave circuits detect the amplitude variation and the corresponding duration of the high and low pulses to determine the value of the transmitted bits. An end-of-transmission (generally the end of a frame) is coded by the transmitter circuit in the form of a high state (bus deallocation) for a duration longer than period T.

The embodiments of the identification method described hereabove apply to such a communication bus since the transmission of a 0 also holds the priority on the bus over the transmission of a state 1. An interpretation of the state of the bus enables the slave circuits to determine the order relation which links their identifiers and which sets the order of subsequent communications.

Various alterations and modifications will occur to those skilled in the art. In particular, the embodiments which have been described more generally apply to any serial communication bus in which the bus is, when idle, set to a voltage different from the ground, be this voltage positive or negative, provided for each bit to be transmitted over an identical period whatever its state.

Further, the practical implementation of the described embodiments is within the abilities of those skilled in the art based on the functional indications and by using current circuits equipping slave circuits. In the case where the circuits are equipped with programmable microcontrollers, the described embodiments may be implemented on existing systems, which just have to be reprogrammed.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of communication between a master circuit and two slave circuits over a serial bus wherein:
   the two slave circuits simultaneously transmit their associated identifiers;
   the two slave circuits simultaneously transmit the inverse of these identifiers; and
   each slave circuit uses combinations of the identifiers and inverse identifiers present on the bus from both simultaneous transmissions to determine an order of communication between the two circuits.

2. The method of claim 1, wherein the master circuit triggers the steps of transmitting, by the two slave circuits, identifiers and inverse identifiers by the sending of a specific control signal over the bus.

3. The method of claim 2, wherein said control signal is preceded by sending, by the master circuit, an address common to the two slave circuits.

4. The method of claim 1, wherein each slave circuit determines a relation between its own identifier and that of the other slave circuit.

5. The method of claim 4, wherein the relation between the identifiers is an order relation.

6. The method of claim 1, wherein each slave circuit transmits to the master circuit an address concerning it, the transmission order being set by the relation between the respective identifiers of the slave circuits.

7. The method of claim 1, wherein each slave circuit transmits to the master circuit its identifier as an address.

8. The method of claim 1, wherein the bus is an open-drain (or open-collector) bus in which a bit is transmitted over a period having a duration independent from the state of the bit.

9. An electronic circuit of transmission over a serial bus, comprising means capable of implementing the method of claim 1.

10. A master-slave system of transmission between a master and two slaves, comprising circuits of claim 9.

11. A method for a first slave circuit to communicate with a master circuit in a system of devices configured to communicate over a serial bus, the method comprising:
transmitting, by the first slave circuit, an identifier of the first slave circuit to the master circuit responsive to receiving a first control signal from the master circuit; and
transmitting, by the first slave circuit, an inverse of the identifier of the first slave circuit to the master circuit responsive to receiving the same control signal from the master circuit.

12. The method of claim 11, further comprising:
receiving, by the first slave circuit, a first signal associated with the transmitted identifier of the first slave circuit while transmitting the identifier of the first slave circuit;
receiving, by the first slave circuit, a second signal associated with the transmitted inverse identifier of the first slave circuit while transmitting the inverse identifier of the first slave circuit; and
determining, by the first slave circuit, a communication order between the first slave circuit and a second slave circuit with the master circuit based at least upon the first signal and second signal.

13. The method of claim 12, wherein the identifier of the first slave circuit is transmitted to a data line of the serial bus and the first signal is received from the same data line.

14. The method of claim 12, further comprising checking a communication order rule to determine the communication order.

15. The method of claim 12, further comprising transmitting an address for the first slave circuit to the master circuit according to the determined communication order.

16. The method of claim 15, wherein the address for the first slave circuit is the identifier of the first slave circuit.

17. A system of devices configured to communicate over a serial bus, the system comprising:
a master circuit;
a first slave circuit having a first address; and
a second slave circuit having the first address, wherein the first and second slave circuits are configured to determine a communication order with the master circuit based at least upon a logical AND of identifiers of the first and second slave circuits and a logical NOR or NAND of the identifiers of the first and second slave circuits.

18. The system of claim 17, wherein the first slave circuit is configured to:
transmit the identifier of the first slave circuit responsive to the master circuit transmitting the first address; and
receive a first signal associated with the transmitted identifier of the first slave circuit while transmitting the identifier of the first slave circuit.

19. The system of claim 18, wherein the first slave circuit is further configured to transmit the identifier of the first slave circuit to a data line of the serial bus and receive the first signal from the same data line.

20. The system of claim 18, wherein the first slave circuit is further configured to:
transmit an inverse identifier of the first slave circuit responsive to the master circuit transmitting the first address;
receive a second signal associated with the transmitted inverse identifier of the first slave circuit while transmitting the inverse identifier of the first slave circuit; and
use the first signal and second signal to determine the communication order with the master circuit.

21. The system of claim 17, wherein the first slave circuit comprises a cartridge of a printer.

22. The system of claim 17, wherein the first slave circuit comprises a battery.

23. The system of claim 17, wherein the first slave circuit comprises a microcontroller.

24. The system of claim 17, wherein the serial bus is a multi-wire bus comprising an open-drain or open-collector data line.

25. A first slave circuit configured to communicate in a system of devices linked by a serial bus, the first slave circuit comprising:
a signal receive circuit coupled to the serial bus; and
an open-drain or open-collector signal transmitter circuit coupled to the serial bus, wherein the first slave circuit is configured to:
transmit an identifier of the first slave circuit to a master circuit responsive to receiving an address of the first slave circuit from the master circuit; and
transmit an inverse of the identifier of the first slave circuit to the master circuit responsive to receiving the same address of the first slave circuit from the master circuit.

26. The slave circuit of claim 25, wherein the first slave circuit is further configured to:
receive a first signal associated with the transmitted identifier of the first slave circuit while transmitting the identifier of the first slave circuit;
receive a second signal associated with the transmitted inverse identifier of the first slave circuit while transmitting the inverse identifier of the first slave circuit; and
determine a communication order between the first slave circuit and a second slave circuit with the master circuit based at least upon the first signal and second signal.

27. The slave circuit of claim 26, wherein the first slave circuit is further configured to transmit the identifier of the first slave circuit to a data line of the serial bus and receive the first signal from the same data line.

28. The slave circuit of claim 25, wherein the first slave circuit comprises a battery.

29. The slave circuit of claim 25, wherein the first slave circuit comprises an ink cartridge.

30. The slave circuit of claim 25, wherein the first slave circuit includes a microcontroller.

* * * * *